United States Patent
Zhang et al.

(10) Patent No.: US 7,298,447 B1
(45) Date of Patent: *Nov. 20, 2007

(54) LIQUID CRYSTAL DISPLAY PANEL

(75) Inventors: Hongyong Zhang, Kanagawa (JP);
Satoshi Teramoto, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/548,524

(22) Filed: Apr. 13, 2000

Related U.S. Application Data

(63) Continuation of application No. 08/877,919, filed on Jun. 16, 1997, now Pat. No. 6,055,034.

(30) Foreign Application Priority Data

Jun. 25, 1996 (JP) .................................. 8-185636

(51) Int. Cl.
G02F 1/1339 (2006.01)
G02F 1/1345 (2006.01)

(52) U.S. Cl. ...................................... 349/155; 349/151

(58) Field of Classification Search ............ 349/42–43, 349/44, 149–152, 142, 155; 257/59, 72, 257/60; 345/205–206
See application file for complete search history.

(56) References Cited

U.S. PATENT DOCUMENTS

| | | | | |
|---|---|---|---|---|
| 4,640,584 A | * | 2/1987 | Tsubakimoto et al. ...... | 350/344 |
| 4,983,429 A | * | 1/1991 | Takayanagi et al. ........... | 428/1 |
| 5,148,301 A | | 9/1992 | Sawatsubashi et al. ..... | 349/153 |
| 5,179,460 A | | 1/1993 | Hinata et al. ............... | 349/149 |
| 5,323,042 A | * | 6/1994 | Matsumoto .................. | 257/59 |
| 5,396,356 A | | 3/1995 | Fukuchi ....................... | 349/153 |
| 5,504,601 A | | 4/1996 | Watanabe et al. | |
| 5,572,046 A | * | 11/1996 | Takemura ..................... | 257/59 |
| 5,619,358 A | | 4/1997 | Tanaka et al. .............. | 349/143 |
| 5,621,553 A | | 4/1997 | Nishiguchi et al. ......... | 349/153 |
| 5,650,664 A | | 7/1997 | Sakamoto ..................... | 257/59 |
| 5,684,555 A | | 11/1997 | Shiba et al. ................. | 349/149 |
| 5,739,549 A | * | 4/1998 | Takemura et al. ............ | 357/59 |
| 5,745,202 A | * | 4/1998 | Yamauchi et al. .......... | 349/110 |

(Continued)

FOREIGN PATENT DOCUMENTS

JP 58-085478 5/1983

(Continued)

OTHER PUBLICATIONS

Office Action issued in U.S. Appl. No. 09/549,215 dated May 18, 2005.

(Continued)

*Primary Examiner*—Dung T. Nguyen
(74) *Attorney, Agent, or Firm*—Fish & Richardson P.C.

(57) ABSTRACT

A laminated spacer portion formed by laminating various thin films that constitute thin-film transistors is disposed in peripheral driver circuits. As a result, even in a structure in which part of a sealing member is disposed above the peripheral driver circuits, pressure exerted from spacers in the sealing member is concentrated on the laminated spacer portion, whereby destruction of a thin-film transistor of the peripheral driver circuits can be prevented caused by the pressure from the sealing portion.

40 Claims, 3 Drawing Sheets

U.S. PATENT DOCUMENTS

| | | | |
|---|---|---|---|
| 5,745,208 A | 4/1998 | Grupp et al. ............... 349/153 |
| 5,784,132 A | 7/1998 | Hashimoto |
| 5,798,812 A * | 8/1998 | Nishiki et al. ............. 349/152 |
| 5,889,291 A * | 3/1999 | Koyama et al. .............. 257/59 |
| 5,929,948 A * | 7/1999 | Ohori et al. ................. 349/44 |
| 5,955,744 A | 9/1999 | Gu et al. .................... 257/764 |
| 5,995,189 A * | 11/1999 | Zhang ........................ 349/153 |
| 6,055,034 A * | 4/2000 | Zhang et al. ............... 349/151 |
| 6,115,097 A | 9/2000 | Yamazaki ................... 349/151 |
| 6,249,333 B1 * | 6/2001 | Zhang et al. ............... 349/151 |

FOREIGN PATENT DOCUMENTS

| | | |
|---|---|---|
| JP | 62-205320 | 9/1987 |
| JP | 63-026631 | 2/1988 |
| JP | 02-242230 | 9/1990 |
| JP | 03-024634 | 3/1991 |
| JP | 05-127181 | 5/1993 |
| JP | 6-138488 | 5/1994 |
| JP | 06-138488 | 5/1994 |
| JP | 6-186579 | 7/1994 |
| JP | 06-186588 | 7/1994 |
| JP | 06-258661 | 9/1994 |
| JP | 06-258662 | 9/1994 |
| JP | 6-308505 | 11/1994 |
| JP | 06-308510 | 11/1994 |
| JP | 08-076145 | 3/1996 |

OTHER PUBLICATIONS

"Withdrawal: Selected IBM PS/2 Mobile Systems (300, 700/700C) and Features," IBM Announcement Letter, No. 193-268, Sep. 8, 1993.

Lewis et al, "Driver Circuits for AMLCD's," Conference Record of the 1994 International Display Research Conference and International Workshops on Active-Matrix LCD's & Display Materials, pp. 56-64, Oct. 1994.

* cited by examiner

LIQUID CRYSTAL DISPLAY PANEL

This is a continuation of U.S. application Ser. No. 08/877,919, filed Jun. 16, 1997, now U.S. Pat. No. 6,055,034.

BACKGROUND OF THE INVENTION

1. Field of the Invention

The present invention relates to an active matrix liquid crystal display panel which is integral with peripheral driver circuits, as well as to various apparatuses using such a panel.

2. Description of the Related Art

An active matrix liquid crystal display panel is known in which an active matrix circuit and peripheral driver circuits for driving it are integrated on a glass substrate or a quartz substrate. In such an active matrix liquid crystal display panel, various measures have been taken to minimize the area of portions unnecessary for display, i.e., the area occupied by the peripheral driver circuits.

On the other hand, in the liquid crystal display panel, a sealing member is provided in a peripheral portion to hold, i.e., confine a liquid crystal between a pair of substrates. As one measure to minimize the ares of portions unnecessary for display, it is now required to reduce the area occupied by the sealing member.

The active matrix liquid crystal display panel which is integral with the peripheral driver circuits has a problem that failures likely occur in the peripheral driver circuits. This tendency is more remarkable in a configuration in which part of the sealing member is disposed above the peripheral driver circuits.

This problem occurs in the following manner. The sealing member contains a kind of spacer called a filler to maintain the gap between the substrates. In general, the peripheral driver circuits have a very high degree of integration. In these circumstances, pressure is exerted from the filler on thin-film transistors and a wiring of the peripheral driver circuits which are located right under the filler (the pressure is estimated to be very strong locally), so that a line disconnection, a contact failure, and even a disconnection of a semiconductor layer are likely to occur.

Although spherical substrate gap holding means called spacers are also used in the active matrix area, the occurrence of failures in the active matrix area due to the existence of the spacers is not so serious as in the peripheral driver circuits, because the degree of integration is low in the active matrix area.

SUMMARY OF THE INVENTION

An object of the present invention is to minimize the area of portions other than a pixel matrix circuit in an active matrix liquid crystal display panel which is integral with peripheral driver circuits.

Another object of the invention is to prevent destruction of a peripheral driver circuit due to pressure exerted from a sealing member even in the active matrix liquid crystal display panel that attains the above object.

According to a first aspect of the invention, as shown in FIGS. 1A to 1D and 2 in the form of a specific manufacturing process, there is provided a liquid crystal display panel comprising an active matrix circuit (pixel circuit); a peripheral driver circuit, the active matrix circuit and the peripheral driver circuit being integrated on the same substrate 101; a sealing member (indicated by numeral 206 in FIG. 2), part of the sealing member being disposed above the peripheral driver circuit; thin-film transistors formed in the peripheral driver circuit; and a protrusion (laminated spacer) formed in the peripheral driver circuit, the protrusion being a lamination of materials that constitute the thin-film transistors, the protrusion being projected (see FIG. 1D) from portions where the thin-film transistors are disposed.

According to a second aspect of the invention, as shown in FIGS. 1A to 1D and 2 in the form of a specific manufacturing process, there is provided a liquid crystal display panel comprising an active matrix circuit (pixel circuit); a peripheral driver circuit, the active matrix circuit and the peripheral driver circuit being integrated on the same substrate 101; a sealing member (indicated by numeral 206 in FIG. 2), part of the sealing member being disposed above the peripheral driver circuit; thin-film transistors formed in the peripheral driver circuit; and a protrusion (laminated spacer) formed in the peripheral driver circuit in addition to the thin-film transistors, the protrusion being a lamination of materials that constitute the thin-film transistors, the protrusion being higher (see FIG. 1D) than portions where the thin-film transistors are disposed.

According to a third aspect of the invention, as shown in FIGS. 1A to 1D and 2 in the form of a specific manufacturing process, there is provided a liquid crystal display panel comprising an active matrix circuit (pixel circuit); a peripheral driver circuit, the active matrix circuit and the peripheral driver circuit being integrated on the same substrate 101; a sealing member (indicated by numeral 206 in FIG. 2), part of the sealing member being disposed above the peripheral driver circuit; thin-film transistors formed in the peripheral driver circuit; and a protrusion formed in the peripheral driver circuit in addition to the thin-film transistors, the protrusion being a lamination of materials that constitute the thin-film transistors, the protrusion having a function of a spacer.

According to a fourth aspect of the invention, as shown in FIGS. 1A to 1D and 2 in the form of a specific manufacturing process, there is provided a liquid crystal display panel comprising an active matrix circuit (pixel circuit); a peripheral driver circuit, the active matrix circuit and the peripheral driver circuit being integrated on the same substrate 101; a sealing member (indicated by numeral 206 in FIG. 2), part of the sealing member being disposed above the peripheral driver circuit; thin-film transistors formed in the peripheral driver circuit; and a laminated portion (laminated spacer) formed in the peripheral driver circuit in addition to the thin-film transistors, the laminated portion having more laminated layers (see FIG. 1D) than portions where the thin-film transistors are disposed in the peripheral driver circuit.

As shown in FIGS. 1A to 1D and 2, the protrusion (laminated spacer) is formed by laminating all the thin films that constitute the pixel circuit and the peripheral driver circuits, the latter circuits having a high degree of integration. With this structure, pressure exerted from spacers 204 in the sealing member 206 is concentrated on the protrusion. As a result, the thin-film transistors and the wiring of the peripheral driver circuits can be prevented from being damaged.

DETAILED DESCRIPTION OF THE PREFERRED EMBODIMENTS

Embodiment 1

Figure 1A:
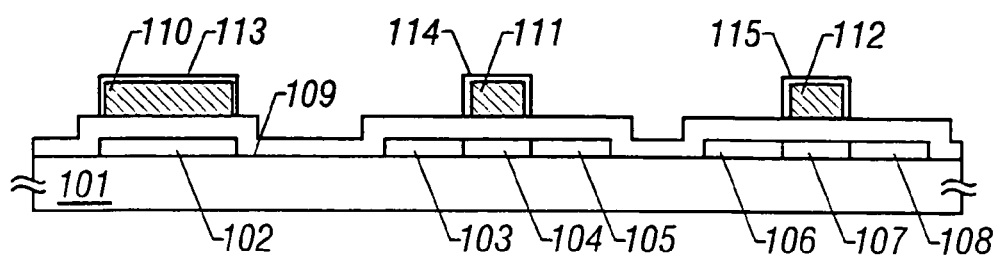
FIGS. 1A to 1D are sectional views showing a manufacturing process of an active matrix liquid crystal panel according to Embodiment 1 of the present invention.

This embodiment is directed to an active matrix liquid crystal display panel which is integral with peripheral driver circuits. FIGS. 1A to 1D and 2 show its manufacturing process.

This embodiment is directed to manufacture of a liquid crystal display panel that is constituted of a pixel circuit (active matrix circuit) and peripheral driver circuits for driving it. For example, the peripheral driver circuits are composed of a shift register circuit, a buffer circuit, and a sampling circuit.

First, a base film (not shown) is formed on a glass substrate 101. Alternatively, a quartz substrate may be used. In this embodiment, a 3,000-Å-thick silicon oxide film is formed by plasma CVD as the base film.

A 500-Å-thick amorphous silicon film (not shown) is then formed by low-pressure thermal CVD.

A crystalline silicon film is obtained by crystallizing the amorphous silicon film by illuminating it with laser light. Other means may be used to obtain a crystalline silicon film.

The thus-obtained crystalline silicon film is patterned into a pattern 102, a pattern indicated by numerals 103 to 105, and a pattern indicated by numerals 106 to 108. The pattern 102 will become a semiconductor pattern to constitute a laminated spacer 1000. The pattern indicated by numerals 103 to 105 will become an active layer pattern of a thin-film transistor in a peripheral driver circuit 1001. The pattern indicated by numerals 106 to 108 will become an active layer pattern of a thin-film transistor in a pixel circuit (active matrix circuit) 1002.

The laminated spacer is a laminated protrusion of all the components that are formed intentionally in the TFT substrate. If the laminated spacer is disposed in a peripheral driver circuit, pressure from the spacers for holding the substrate gap is concentrated on the laminated spacer. As a result, pressure exerted on thin-film transistors and a wiring that constitute the peripheral driver circuits can be reduced.

In this embodiment, it is assumed that all the illustrated thin-film transistors are of an n-channel type. In general, the peripheral driver circuits are constituted of n-channel and p-channel thin-film transistors. On the other hand, n-channel or p-channel transistors are used in the pixel circuit.

After the patterning of the semiconductor layer, a gate insulating film 109 is formed, and then an aluminum film (not shown) for forming gate electrodes (and gate lines extending therefrom) is formed on the gate insulating film 109. In this embodiment, a 4,000-Å-thick aluminum film is formed by sputtering by using an aluminum target containing scandium at 0.18 wt %.

The thus-formed aluminum film is patterned into aluminum patterns 110 to 112. The pattern 110 is an aluminum pattern to constitute the laminated spacer. The pattern 111 is a gate electrode of the thin-film transistor in the peripheral driver circuit. The pattern 112 is a gate electrode of the thin-film transistor in the pixel circuit.

Subsequently, 1,000-Å-thick anodic oxide films 113 to 115 are formed by anodization in which the aluminum patterns 110 to 112 are used as the anodes. Thus, the state of FIG. 1A is obtained.

Silicon nitride films may be used instead of anodic oxide films. As a further alternative, oxide films (plasma oxide films) may be formed by plasma processing in an oxidizing atmosphere.

Figure 1B:
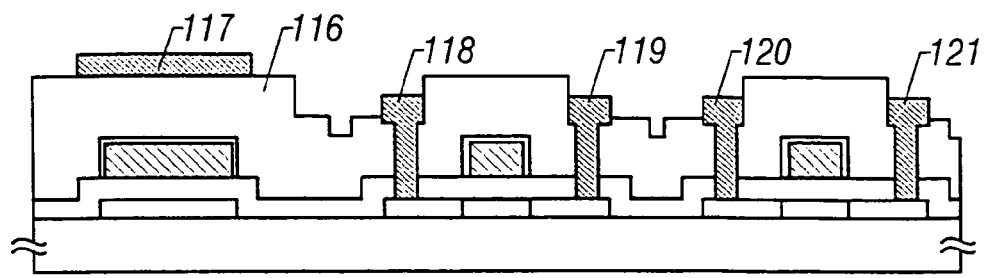
Figure 1C:
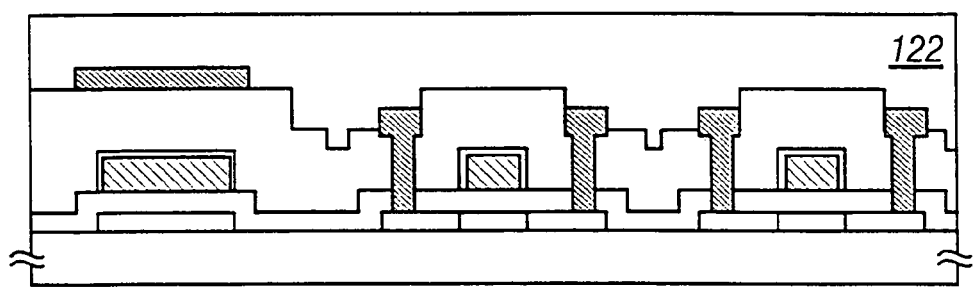

In the state of FIG. 1A, a 3,000-Å-thick silicon nitride film as a first interlayer insulating film 116 is formed by plasma CVD (see FIG. 1B).

After contact holes are formed, a multilayer metal film in which an aluminum film is interposed between titanium films is formed by sputtering.

The three-layer metal film is patterned into a pattern 117, a source electrode 118, a drain electrode 119, a source electrode 120, and a drain electrode 121. The pattern 117 will become part of the laminated spacer. Thus, the state of FIG. 1B is obtained.

Thereafter, a 15,000-Å-thick resin layer 122, specifically a polyimide layer, as a second interlayer insulating film is formed by spin coating. The use of the resin layer 122 is advantageous in that its surface can be made flat.

Subsequently, a 3,000-Å-thick titanium film is formed by sputtering, and then patterned into a pattern 124 and a pattern 125. The pattern 124 is a titanium film pattern to become part of the laminated spacer. The pattern 125 is a black matrix (BM), which has a function of shielding the thin-film transistors in the pixel circuit from light.

Then, a 3,000-Å-thick resin layer 126, specifically a polyimide layer, as a third interlayer insulating film 126 is formed by spin coating.

Figure 1D:
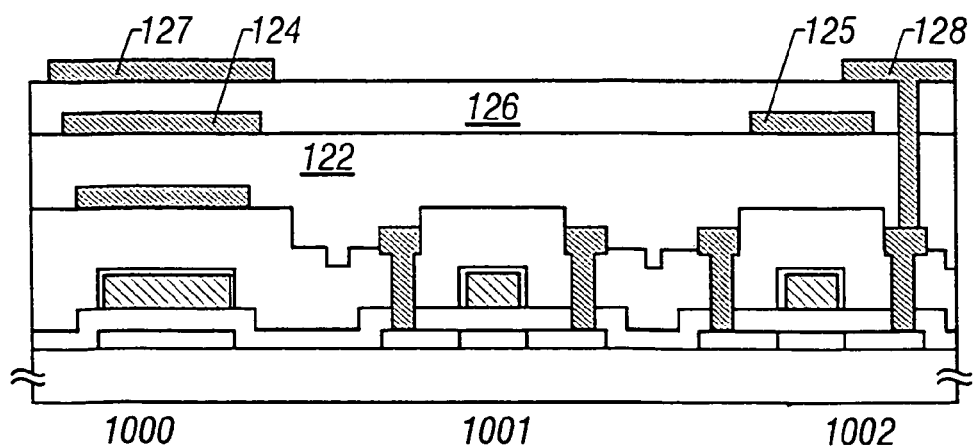

After contact holes are formed, a 1,000-Å-thick ITO film is formed over the entire surface by sputtering. The ITO film is patterned into a pattern 127 and an ITO pixel electrode 128. The pixel electrode 128 is in contact with the drain electrode 121. An auxiliary capacitance is formed in a region where the pixel electrode 128 and the black matrix 125 coextend. Thus, the state of FIG. 1D is obtained.

The ITO pattern 127 is also left, as a dummy, in the laminated spacer portion. This makes the laminated spacer portion the thickest in the entire substrate structure. That is, the laminated spacer portion is provided as a protrusion which is wider than a given area and in which all the components are laminated.

Figure 2:
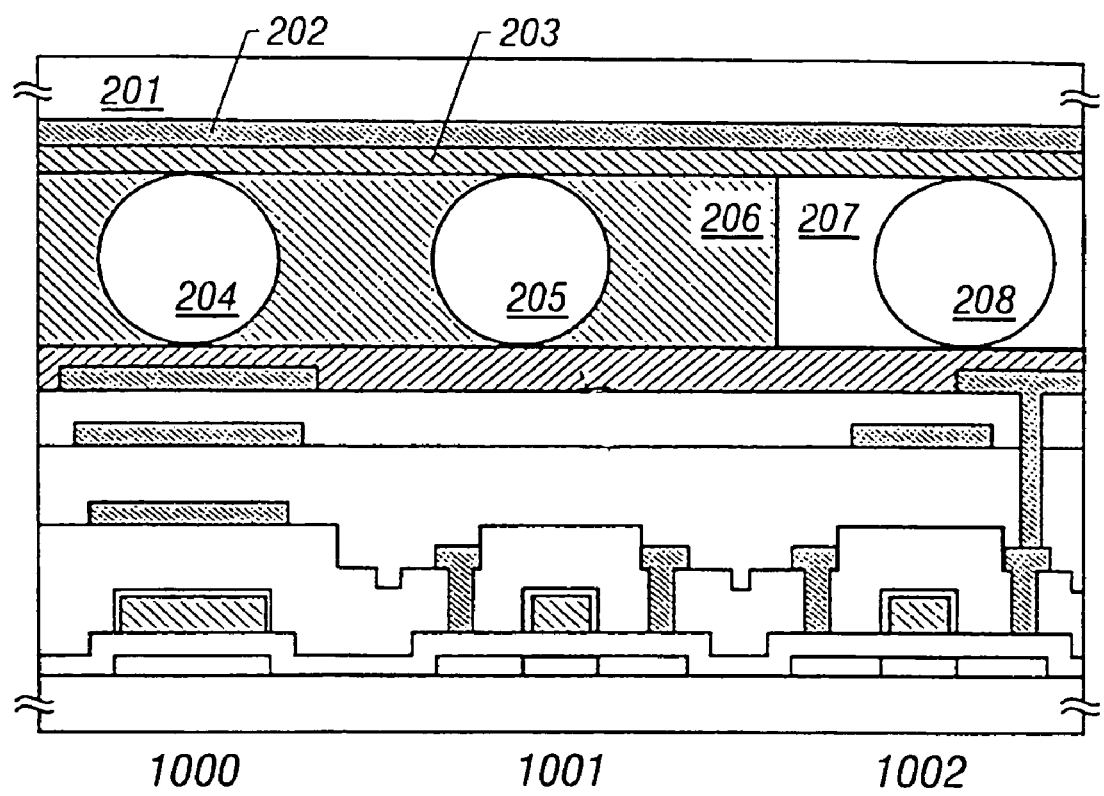
FIG. 2 is a sectional view showing the active matrix liquid crystal panel according to Embodiment 1 of the invention.

Subsequently, an opposed glass substrate 201 (or a quartz substrate) is prepared as shown in FIG. 2. An opposed electrode 202 and an orientation film 203 are formed on the opposed glass substrate 201.

Reference numeral 206 denotes a sealing member, and numerals 204 and 205 denote spacers included in the sealing member 206. A liquid crystal 207 is sealed within the liquid crystal cell by the sealing member 206.

In the structure shown in FIG. 2, pressure exerted from the spacers 204 and 205 is concentrated on the laminated spacer portion. This is because the laminated spacer portion is a highest protrusion having a certain area.

The coextending portion of the black matrix 125 and the pixel electrode 128 in the pixel circuit is equal in height (i.e., thickness) to the laminated spacer portion. However, since the coextending portion has only a small area and the degree of integration is low in the pixel circuit, the occurrence of wiring disconnections and TFT failures due to pressure exerted from the spacer 208 is negligible.

The structure of FIG. 2 is particularly advantageous in that line disconnections and operation failures of TFTs can be prevented in the peripheral driver circuit regions where the degree of integration is high.

As described above, by providing the laminated spacer in the active matrix liquid crystal display panel which is integral with the peripheral driver circuits, the peripheral driver circuits can be prevented from being damaged by pressure exerted from spacers that are included in the sealing member even if part of the sealing member is disposed above the peripheral driver circuits.

Embodiment 2

This embodiment is directed to a case where the invention is applied to a configuration in which not only the peripheral driver circuits but also various processing circuits and memory circuits are integrated on the same substrate.

The structure called "system on panel" has been proposed as an advanced version of the liquid crystal display panel which is integral with the peripheral driver circuits. In this new structure, various processing circuits and memory circuits as well as the active matrix circuit and the peripheral driver circuits are integrated on the same substrate. This structure is intended to reduce the size of an information processing terminal by integrating its functions on a single glass substrate.

Also in this structure, it is required to reduce the area of the portions other than the pixel circuit (active matrix circuit). This necessarily requires a structure in which the sealing member is overlapped with various integrated circuits which constitute various processing circuits and memory circuits.

To satisfy this requirement, the laminated spacer as described in the first embodiment may be provided in such integrated circuits, whereby the integrated circuits constituting various processing circuits and memory circuits which are high in the degree of integration can be prevented from being damaged by pressure exerted from spacers in the sealing member.

Embodiment 3

An active matrix liquid crystal display panel which is integral with peripheral driver circuits according to the invention can be incorporated in various apparatuses.

The use of the invention in an active matrix liquid crystal display panel which is integral with peripheral driver circuits is very advantageous because in such a panel the peripheral driver circuits are required to have a high degree of integration.

Figure 3A:
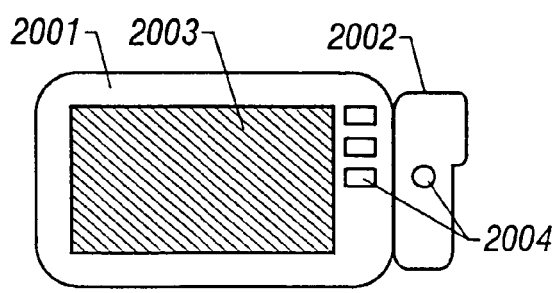
FIGS. 3A to 3E show apparatuses to which a liquid crystal display panel of the invention is applied according to Embodiment 3.

FIG. 3A shows a digital still camera, an electronic camera, or an imaging apparatus called "video movie" which can deal with motion pictures.

This apparatus has a function of electronically storing pictures taken by a CCD camera (or some other proper imaging means) that is incorporated in a camera section 2002. The apparatus also has a function of displaying a picture thus taken on a liquid crystal display panel 2003 that is incorporated in a main body 2001. The apparatus is operated by using operation buttons 2004.

By applying the invention to this apparatus, the non-display area of the liquid crystal display panel 2003 can be minimized, which enables miniaturization of the apparatus.

Figure 3B:
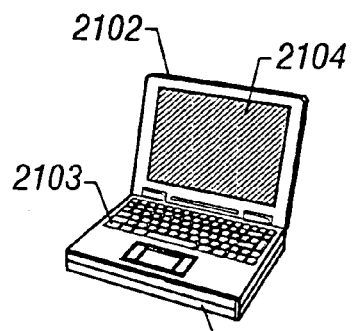

FIG. 3B shows a portable personal computer (information processing apparatus). Provided with a liquid crystal display panel 2104 in a cover 2102 that is attached to a main body 2101 and possible to open and close, this apparatus allows a user to input various information or perform operations for various computations through a keyboard 2103.

Figure 3C:
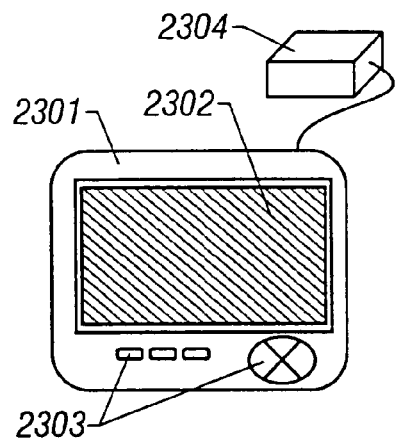

FIG. 3C shows a case where a flat panel display is used in a car navigation system (information processing apparatus). The car navigation system consists of an antenna section 2304 and main body 2301 that incorporates a liquid crystal display panel 2302.

Switching among various pieces of information needed for navigation is performed by operation buttons 2303. A remote controller (not shown) is commonly used for various operations.

Figure 3D:
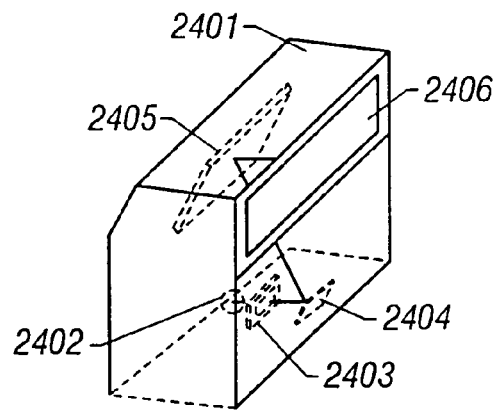

FIG. 3D shows an example of a projection image display apparatus. As shown in FIG. 3D, light emitted from a light source 2402, formed in a main body 2401, optically modulated into an image by a liquid crystal display panel 2403. The image is reflected projected onto a screen 2406 after being reflected by mirrors 2404 and 2405.

Figure 3E:
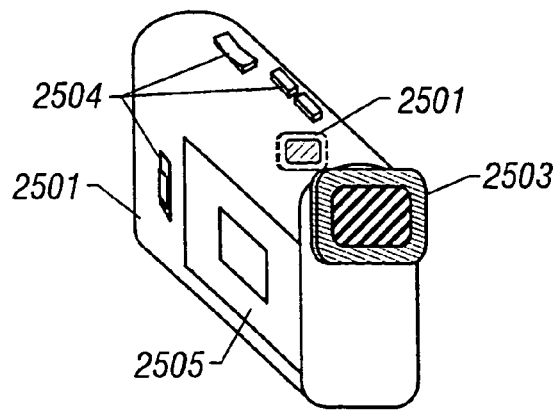

FIG. 3E shows an example in which a main body 2501 of a video camera (imaging apparatus) is provided with a display device called a view finder.

The view finder is generally composed of a liquid crystal display panel 2502 and an eyepiece unit 2503 which displays an image.

The video camera of FIG. 3E is operated by using operation buttons 2504, and pictures are recorded on a magnetic tape that is accommodated in a tape holder 2505. Pictures taken by a camera (not shown) is displayed on the liquid crystal display panel 2502. Pictures recorded on the magnetic tape are displayed on the display panel 2502.

In the video camera of FIG. 3E, it is required to minimize the area of the portions of the liquid crystal display panel 2502 other than the display region (pixel region). Therefore, the employment of the configuration as described in the first embodiment is very advantageous.

As described above, the area of the portions other than the pixel matrix circuit can be minimized in an active matrix liquid crystal display panel which is integral with peripheral driver circuits.

It becomes possible to prevent destruction of a peripheral driver circuit due to pressure exerted from the sealing member even in the active matrix liquid crystal display panel in which the area of the non-display portions is minimized.

What is claimed is:

1. An electric device having at least one liquid crystal display panel, said liquid crystal display panel comprising:
    an active matrix circuit over a first region of a substrate;
    at least one thin film transistor formed in said active matrix circuit, said at least one thin film transistor comprising a semiconductor layer and a gate electrode with a gate insulating film interposed therebetween;
    a source or drain electrode electrically connected to said semiconductor layer;
    a protrusion formed over a second region of said substrate, said protrusion comprising a first layer comprising a same material as said gate electrode a second layer comprising a same material as said source or drain electrode, and a third layer comprising a same material as said semiconductor layer; and
    a sealing member over said protrusion,
    wherein said first layer and said second layer overlap with each other and are insulated from each other.

2. The device according to claim 1 wherein said protrusion is higher than a portion where said thin film transistor is formed.

3. The device according to claim 1 wherein said protrusion has a function of a spacer.

4. The device according to claim 1 wherein said protrusion has more laminated layers than a portion where said thin film transistor is formed.

5. The device according to claim 1 wherein said thin film transistor is a top-gate type.

6. The device according to claim 1 wherein said device is one selected from the group consisting of a digital camera, an electric camera, a video movie, a personal computer, a navigation system, a projection image display apparatus, and a video camera.

7. The device according to claim 1 wherein said protrusion does not include a source or a drain electrode.

8. The device according to claim 1 wherein said first and second layers are insulated from each other by an insulating film comprising a same material as an interlayer insulating film that covers said gate electrode.

9. An electric device having at least one liquid crystal display panel, said liquid crystal display panel comprising:
    an active matrix circuit over a first region of a substrate, said circuit comprising at least one thin film transistor, said at least one thin film transistor comprising a gate electrode, a semiconductor layer, and a gate insulating film interposed therebetween,
    a source or drain electrode electrically connected to said semiconductor layer;
    a laminated spacer formed over a second region of said substrate; and
    a sealing member over said laminated spacer,
    wherein said laminated spacer comprises a first layer comprising a same material as said gate electrode, a second layer comprising a same material as said source or drain electrode, and a third layer comprising a same material as said semiconductor layer, and
    wherein said first layer and said second layer overlap with each other and are insulated from each other.

10. The device according to claim 9 wherein at least one spacer is included in said sealing member.

11. The device according to claim 9 wherein said gate electrode is formed over said semiconductor layer.

12. The device according to claim 9 wherein said source or drain electrode comprises a laminated structure of titanium and aluminum.

13. The device according to claim 9 wherein said device is one selected from the group consisting of a digital camera, an electric camera, a video movie, a personal computer, a navigation system, a projection image display apparatus, and a video camera.

14. The device according to claim 9 wherein said semiconductor layer comprises crystalline silicon.

15. The device according to claim 9 wherein said laminated spacer does not include a source or a drain electrode.

16. The device according to claim 9 wherein said first and second layers are insulated from each other by an insulating film comprising a same material as an interlayer insulating film that covers said gate electrode.

17. An electric device having at least one liquid crystal display panel, said liquid crystal display panel comprising:
    an active matrix circuit over a first region of a substrate, said circuit comprising at least one thin film transistor, said at least one thin film transistor comprising a gate electrode, a semiconductor layer, and a gate insulating film interposed therebetween,
    a source or drain electrode electrically connected to said semiconductor layer;
    a laminated spacer formed over a second region of said substrate; and
    a sealing member over said laminated spacer,
    wherein said laminated spacer comprises a first layer comprising a same material as said gate electrode, a second layer comprising a same material as said semiconductor layer, a third layer comprising a same material as said source or drain electrode, and a fourth layer comprising a same material as said gate insulating film, and
    wherein said first layer and said third layer overlap with each other and are insulated from each other.

18. The device according to claim 17 wherein at least one spacer is included in said sealing member.

19. The device according to claim 17 wherein said gate electrode is formed over said semiconductor layer.

20. The device according to claim 17 wherein said semiconductor layer comprises crystalline silicon.

21. The device according to claim 17 wherein said source or drain electrode comprises a laminated structure of titanium and aluminum.

22. The device according to claim 17 wherein said device is one selected from the group consisting of a digital camera, an electric camera, a video movie, a personal computer, a navigation system, a projection image display apparatus, and a video camera.

23. The device according to claim 17 wherein said laminated spacer does not include a source or a drain electrode.

24. The device according to claim 17 wherein said first and third layers are insulated from each other by an insulating film comprising a same material as an interlayer insulating film that covers said gate electrode.

25. An electric device having at least one liquid crystal display panel, said liquid crystal display panel comprising:
    an active matrix circuit over a first region of a substrate, said circuit comprising at least one thin film transistor, said at least one thin film transistor comprising a gate electrode, a semiconductor layer, and a gate insulating film interposed therebetween,
    a source or drain electrode electrically connected to said semiconductor layer;
    a laminated layer formed over a second region of said substrate; and
    a sealing member over said laminated layer,
    wherein said laminated layer comprises a first layer comprising a same material as said gate electrode, a second layer comprising a same material as said source or drain electrode, and a third layer as a same material as said semiconductor layer, and
    wherein said first layer and said second layer overlap with each other and are insulated from each other.

26. The device according to claim 25 wherein at least one spacer is included in said sealing member.

27. The device according to claim 25 wherein said gate electrode is formed over said semiconductor layer.

28. The device according to claim 25 wherein said source or drain electrode comprises a laminated structure of titanium and aluminum.

29. The device according to claim 25 wherein said device is one selected from the group consisting of a digital camera, an electric camera, a video movie, a personal computer, a navigation system, a projection image display apparatus, and a video camera.

30. The device according to claim 25 wherein said semiconductor layer comprises crystalline silicon.

31. The device according to claim 25 wherein said laminated layer does not include a source or a drain electrode.

32. The device according to claim 25 wherein said first and second layers are insulated from each other by an insulating film comprising a same material as an interlayer insulating film that covers said gate electrode.

33. An electric device having at least one liquid crystal display panel, said liquid crystal display panel comprising:

an active matrix circuit over a first region of a substrate, said circuit comprising at least one thin film transistor, said at least one thin film transistor comprising a gate electrode, a semiconductor layer, and a gate insulating film interposed therebetween, a source or drain electrode electrically connected to said semiconductor layer;

a laminated layer formed over a second region of said substrate; and a sealing member over said laminated layer, wherein said laminated layer comprises a first layer comprising a same material as said gate electrode, a second layer comprising a same material as said semiconductor layer, a third layer comprising a same material as said source or drain electrode, and a fourth layer comprising a same material as said gate insulating film, and wherein said first layer and said third layer overlap with each other and are insulated from each other.

34. The device according to claim 33 wherein at least one spacer is included in said sealing member.

35. The device according to claim 33 wherein said gate electrode is formed over said semiconductor layer.

36. The device according to claim 33 wherein said semiconductor layer comprises crystalline silicon.

37. The device according to claim 33 wherein said source or drain electrode comprises a laminated structure of titanium and aluminum.

38. The device according to claim 33 wherein said device is one selected from the group consisting of a digital camera, an electric camera, a video movie, a personal computer, a navigation system, a projection image display apparatus, and a video camera.

39. The device according to claim 33 wherein said laminated layer does not include a source or a drain electrode.

40. The device according to claim 33 wherein said first and third layers are insulated from each other by an insulating film comprising a same material as an interlayer insulating film that covers said gate electrode.

* * * * *